United States Patent

Takahashi et al.

[11] Patent Number: 5,576,398
[45] Date of Patent: Nov. 19, 1996

[54] THERMOSETTING RESIN COMPOSITION

[75] Inventors: Masayuki Takahashi, Tsukuba; Hiromi Komatsu, Tokyo; Kazuo Kawaguchi; Shuetsu Fujiwara, both of Tsukuba, all of Japan

[73] Assignee: Japan Synthetic Rubber Co., Ltd., Tokyo, Japan

[21] Appl. No.: 561,626

[22] Filed: Nov. 21, 1995

[30] Foreign Application Priority Data

Jul. 7, 1995 [JP] Japan .................... 7-194028

[51] Int. Cl.$^6$ ................................. C08F 283/00
[52] U.S. Cl. .................. 525/528; 525/423; 525/430; 525/452; 525/453; 525/454; 525/504; 525/533; 525/540; 525/907; 528/45; 528/48; 528/65; 528/73; 528/93; 528/312; 528/322
[58] Field of Search .................... 525/423, 430, 525/452, 453, 454, 504, 528, 533, 540, 907; 528/45, 48, 65, 73, 93, 312, 322

[56] References Cited

U.S. PATENT DOCUMENTS

| | | | |
|---|---|---|---|
| 2,853,473 | 9/1958 | Campbell et al. | 260/77.5 |
| 4,169,866 | 10/1979 | Von Bonin et al. | 525/424 |
| 4,954,577 | 9/1990 | Dunwald et al. | 525/420 |
| 4,990,232 | 2/1991 | Alder | 204/157.81 |
| 5,079,326 | 1/1992 | Suzuki et al. | 528/53 |
| 5,126,422 | 6/1992 | Halpaap et al. | 528/45 |
| 5,225,519 | 7/1993 | Tortolina | 528/271 |
| 5,321,101 | 6/1994 | Suzuki et al. | 525/452 |
| 5,393,839 | 2/1995 | Iwamoto | 525/111 |

FOREIGN PATENT DOCUMENTS

| | | |
|---|---|---|
| 62-1714 | 1/1987 | Japan . |
| 4-505632 | 10/1992 | Japan . |
| 4-342713 | 11/1992 | Japan . |

OTHER PUBLICATIONS

Tod W. Campbell, et al., "High Polymers Containing The Carbodiimide Repeat Unit", Journal of Organic Chemistry, vol. 28, Aug. 1963, pp. 2069–2075.

L. M. Alberino, et al., "Preparation and Properties of Polycarbodiimides", Journal of Applied Polymer Science, vol. 21, Jun. 1977, pp. 1999–2008.

"Encyclopedia of Science and Technology", vol. 6, Body et al., pp. 347, 348, 355 and 356.

Primary Examiner—Melvyn I. Marquis
Assistant Examiner—Randy Gulakowski
Attorney, Agent, or Firm—Oblon, Spivak, McClelland, Maier & Neustadt, P.C.

[57] ABSTRACT

A thermosetting resin composition which comprises (A) a resin in which at least one compound having a graft-reactive group such as a carboxyl group, a primary amino group or a secondary amino group and a carboxylic anhydride group has been grafted on a polycarbodiimide and (B) an epoxy compound. The said thermosetting resin composition retains heat resistance, electrically insulating properties and mechanical properties characteristic of polycarbodiimide, is excellent in solubility in various solvents and storage stability in the form of a solution and can be easily cured under mild conditions, and can produce a cured product excellent in humidity resistance, transparency, chemical stability and adhesiveness to various substrates.

22 Claims, No Drawings

THERMOSETTING RESIN COMPOSITION

BACKGROUND OF THE INVENTION

This invention relates to a novel thermosetting resin composition comprising a specific modified polycarbodiimide which composition is excellent in solubility in various solvents and storage stability in the form of a solution, the cured product of which is excellent in humidity resistance, transparency, heat resistance, electrical insulation properties, mechanical properties and the like.

Polycarbodiimides are resins obtained by decarboxylation-condensation of polyisocyanate compounds, and their production processes are disclosed in, for example, D. J. Lyman et al., Die Makromol. Chem., 67, 1 (19–63); E. Deyer et al., J. Am. Chem. Soc., 80, 5495 (1958); L. M. Alberion et al., J. Appl. Polym. Sci., 21, 1999 (1977); T. W. Campbell et al., J. Org. Chem., 28, 2069 (1963); Japanese Patent Application Kokai No. 51-61599; and the like.

Polycarbodiimides are such resins that the carbodiimide groups in the molecule can be cross-linked upon heating and their applications as thermosetting resins having excellent heat resistance are expected. However, there is such a problem that in order to sufficiently cure the polycarbodiimide, a long period of time is required even when the polycarbodiimide is heated at a high temperature. And there is another problem that since polycarbodiimides are low in solubility in various solvents and when they are stored in solution, flocculation of polymer proceeds gradually even in a cold dark place, they are difficult to store stably for a long period of time. Thus it cannot be said that the characteristics thereof as a thermosetting resin have been sufficiently utilized in practice.

Therefore, an attempt has been made to improve the curing velocity by mixing various compounds with the polycarbodiimides. For example, Japanese Patent application Kokai No. 61-235414 proposes a thermosetting resin composition obtained by mixing a polycarbodiimide with an active hydrogen-containing compound. However, this method is disadvantageous in that the heat resistance characteristic of the polycarbodiimide is damaged. Also, Japanese Patent Application Kokai No. 4-161426 proposes a thermosetting resin composition obtained by mixing a polyisocyanate compound with a polycarbodiimide. However, the curing temperature of this composition is as high as about 250° C. and hence the curing characteristics-improving effect is still insufficient. In addition, these resin compositions are not improved in storage stability in the form of a solution at all.

Moreover, a thermosetting resin composition which is a mixture of a polycarbodiimide with an epoxy compound and a curing catalyst is known, and, for example, Japanese Patent Application Kokai No. 62-1714 proposes the use of a tertiary amine as the curing catalyst and Japanese Patent Application Kokai No. 4-342713 proposes the use of a zinc halide or a mixture thereof with an onium salt as the curing catalyst. However, among these methods, the former has such a problem that since the tertiary amine has properties of accelerating the cross-linking reaction of polycarbodiimide, the storage stability of the resin composition in the form of a solution is rather deteriorated, and in the latter case, not only is the storage stability of the resin composition unimproved, but also halogens, zinc and the like resulting from the catalyst remain as a migratable impurities, so that the resin composition cannot be used in such fields that said impurities become a problem, in particular, in the electronic parts field, and hence, it follows that the area of use of the resin composition is remarkably restricted.

In short, a conventional thermosetting resin composition comprising a polycarbodiimide as the main component is not always satisfactory in the aspect of balance of collective characteristics of heat resistance, electrical insulation properties, mechanical properties and the like as well as the storage stability in the form of a solution and curing characteristics.

SUMMARY OF THE INVENTION

An object of this invention is to provide a polycarbodiimide-based thermosetting resin composition which retains the heat resistance, electrical insulation properties, mechanical properties and the like characteristic of polycarbodiimide as they are, is excellent in solubility in various solvents and storage stability in the form of a solution and can be easily cured under mild conditions without using a curing catalyst, the cured product of which is excellent in humidity resistance, transparency, chemical stability, adhesiveness to various substrates, and the like.

Other objects and advantages of this invention will become apparent from the following description.

According to this invention, there is provided a thermosetting resin composition which comprises:

(A) a resin in which at least one compound having a graft-reactive group and a carboxylic anhydride group (referred to hereinafter as the reactive compound) has been grafted on a polycarbodiimide having a repeating unit represented by the general formula (1):

$$—N{=}C{=}N—R^1—\qquad(1)$$

wherein $R^1$ represents a divalent organic group (the resin is referred to hereinafter as the modified polycarbodiimide), and (B) an epoxy compound.

DETAILED DESCRIPTION OF THE INVENTION

Modified polycarbodiimide
<Polycarbodiimide>

First of all, it should be understood that the method of the synthesis of a polycarbodiimide to be used in the synthesis of the modified polycarbodiimide is not critical; however, the polycarbodiimide can be synthesized by reacting, for example, an organic polyisocyanate in the presence of a catalyst which can accelerate the carbodiimidization reaction of the isocyanate group (referred to hereinafter as the carbodiimidizing catalyst).

The organic polyisocyanate used in the synthesis of the polycarbodiimide is preferably an organic diisocyanate. Said organic diisocyanate includes, for example, phenylene-1,3-diisocyanate, phenylene-1,4-diisocyanate, 1-methoxyphenylene-2,4-diisocyanate, 1-methylphenylene-2,4-diisocyanate, 2,4-tolylene diisocyanate, 2,6-tolylene diisocyanate, 1,3-xylylene diisocyanate, 1,4-xylylene diisocyanate, biphenylene-4,4'-diisocyanate, 3,3'-dimethoxybiphenylene-4,4'-diisocyanate, 3,3'-dimethylbiphenylene-4,4'-diisocyanate, diphenylmethane-2,4'-diisocyanate, diphenylmethane-4,4'-diisocyanate, 3,3'-dimethoxydiphenylmethane-4,4'-diisocyanate, 3,3'-dimethyldiphenylmethane-4,4'-diisocyanate, naphthylene-1,5-diisocyanate, cyclobutylene-1,3-diisocyanate, cyclopentylene-1,3-diisocyanate, cyclohexylene-1,3-diisocyanate, cyclohexylene-1,4-diisocyanate, 1-methylcyclohexylene-2,4-diisocyanate, 1-methylcyclohexylene-2,6- diisocyanate, 1-isocyanato-3,3,5-trimethyl-5-isocyanatomethylcyclohexane, 1,3-bis(isocyanatomethyl)cyclohexane, 1,4-bis(isocyanatomethyl)cyclohexane, isophorone diisocyanate, dicyclohexylmethane-2,4'-diisocyanate, dicyclohexylmethane-4,4'-diisocyanate, ethylene diisocyanate, tetramethylene-1,4-diisocyanate, hexamethylene-1,6-diisocyanate, dodecamethylene-1,12-diisocyanate, lysine diisocyanate methyl ester and the like; isocyanate-terminated prepolymers obtained by reacting a stoichiometrically excessive amount of one of these organic diisocyanates with a difunctional, active hydrogen-containing compound; and the like.

The above organic diisocyanates can be used alone or in admixture of two or more.

Other organic polyisocyanates which can be, if necessary, used together with the organic diisocyanates include tri- or more functional, organic polyisocyanates, for example, benzene-1,3,5-triisocyanate, diphenylmethane-2,4,4'-triisocyanate, diphenylmethane-2,5,4'-triisocyanate, triphenylmethane-2,4',4"-triisocyanate, triphenylmethane-4,4',4"-triisocyanate, diphenylmethane-2,4,2',4'-tetraisocyanate, diphenylmethane-2,5,2',5'-tetraisocyanate, cyclohexane-1,3,5-triisocyanate, 1,3,5-tris(isocyanatomethyl)cyclohexane, 1,3,5-tris(isocyanatomethyl)-3,5-dimethylcyclohexane, 1,3,5-tris(isocyanatomethyl)-1,3,5-trimethylcyclohexane, dicyclohexylmethane-2,4,2'-triisocyanate, dicyclohexylmethane-2,4,4'-triisocyanate and the like; isocyanate-terminated prepolymers obtained by reacting a stoichiometrically excessive amount of one of the above tri- or more functional organic polyisocyanates with a di- or more functional, active hydrogen-containing compound; and the like.

The above-mentioned other polyisocyanates can be used alone or in admixture of two or more, and the amount thereof is preferably 0 to 40 parts by weight, more preferably 0 to 20 parts by weight, per 100 parts by weight of the organic diisocyanate.

Moreover, in the synthesis of the polycarbodiimide, if necessary, an organic monoisocyanate can be added when the organic polyisocyanate contains the above other organic polyisocyanates, thereby adequately controlling the molecular weight of the polycarbodiimide to be obtained. In addition, when the organic diisocyanate is used along with the organic monoisocyanate, a polycarbodiimide having a relatively low molecular weight can be obtained.

The above organic monoisocyanates include alkyl monoisocyanates such as methyl isocyanate, ethyl isocyanate, n-propyl isocyanate, n-butyl isocyanate, lauryl isocyanate, stearyl isocyanate and the like; cycloalkyl monoisocyanates such as cyclohexyl isocyanate, 4-methylcyclohexyl isocyanate, 2,5-dimethylcyclohexyl isocyanate and the like; and aryl monoisocyanates such as phenyl isocyanate, o-tolyl isocyanate, m-tolyl isocyanate, p-tolyl isocyanate, 2-methoxyphenyl isocyanate, 4-methoxyphenyl isocyanate, 2-chlorophenyl isocyanate, 4-chlorophenyl isocyanate, 2-trifluoromethylphenyl isocyanate, 4-trifluoromethylphenyl isocyanate, naphthalene-1-isocyanate and the like.

The above organic monoisocyanates can be used alone or in admixture of two or more, and the amount of the organic monoisocyanate used may be varied depending upon the desired molecular weight of the polycarbodiimide and the presence or absence of the above other organic polyisocyanates and the like; however, it is preferably 0 to 40 parts by weight, more preferably 0 to 20 parts by weight, per 100 parts by weight in total of all the organic polyisocyanate components.

The carbodiimidizing catalyst includes phospholene compounds such as 1-phenyl-2-phospholene-1-oxide, 1-phenyl-3-methyl-2-phospholene-1-oxide, 1-phenyl-2-phospholene-1-sulfide, 1-phenyl-3-methyl-2-phospholene-1-sulfide, 1-ethyl-2-phospholene-1-oxide, 1-ethyl-3-methyl-2-phospholene-1-oxide, 1-ethyl-2-phospholene-1-sulfide, 1-ethyl-3-methyl-2-phospholene-1-sulfide, 1-methyl-2-phospholene-1-oxide, 1-methyl-3-methyl-2-phospholene-1-oxide, 1-methyl-2-phospholene-1-sulfide, 1-methyl-3-methyl-2-phospholene-1-sulfide, 3-phospholene isomers thereof and the like; metal carbonyl complexes such as iron pentacarbonyl, diiron nonacarbonyl, nickel tetracarbonyl, tungsten hexacarbonyl, chromium hexacarbonyl and the like; acetylacetone complexes of beryllium, aluminum, zirconium, chromium, iron and the like; and phosphoric acid esters such as trimethyl phosphate, triethyl phosphate, triisopropyl phosphate, tri-t-butyl phosphate, triphenyl phosphate and the like.

The above carbodiimidizing catalysts can be used alone or in admixture of two or more, and the amount of the catalyst used is preferably 0.001 to 30 parts by weight, more preferably 0.01 to 10 parts by weight, per 100 parts by weight in total of all the organic isocyanate components.

The synthesis reaction of the polycarbodiimide can be carried out in the absence of a solvent or even in a suitable solvent.

The above solvent may be any solvent as far as it can dissolve the polycarbodiimide upon heating during the synthesis reaction, and includes halogenated hydrocarbon solvents such as 1,1-dichloroethane, 1,2-dichloroethane, 1,1,1-trichloroethane, 1,1,2-trichloroethane, 1,1,1,2-tetrachloroethane, 1,1,2,2-tetrachloroethane, pentachloroethane, hexachloroethane, 1,1-dichloroethylene, 1,2-dichloroethylene, trichloroethylene, tetrachloroethylene, chlorobenzene, o-dichlorobenzene, m-dichlorobenzene, p-chlorobenzene, 1,2,4-trichlorobenzene, trichloromethylbenzene and the like; ether solvents such as dioxane, anisole, tetrahydrofuran, tetrahydropyran, diethylene glycol dimethyl ether, diethylene glycol diethyl ether, diethylene glycol dipropyl ether, diethylene glycol dibutyl ether, diethylene glycol monomethyl ether, diethylene glycol monoethyl ether, diethylene glycol monopropyl ether, diethylene glycol monobutyl ether, triethylene glycol monomethyl ether and the like; ketone solvents such as cyclohexanone, 2-acetylcyclohexanone, 2-methylcyclohexanone, 3-methylcyclohexanone, 4-methylcyclohexanone, cycloheptanone, 1-decalone, 2-decalone, 2,4-dimethyl-3-pentanone, 4,4-dimethyl-2-pentanone, 2-methyl-3-hexanone, 5-methyl-2-hexanone, 2-heptanone, 3-heptanone, 4-heptanone, 2-methyl-3-heptanone, 5-methyl-3-heptanone, 2,6-dimethyl-4-heptanone, 2-octanone, 3-octanone, 2-nonanone, 3-nonanone, 5-nonanone, 2-decanone, 3-decanone, 4-decanone and the like; aromatic hydrocarbon solvents such as benzene, toluene, xylene, ethylbenzene, cumene and the like; amide solvents such as N-methyl-2-pyrrolidone, N-acetyl-2-pyrrolidone, N-benzyl-2-pyrrolidone, N-methyl-3-pyrrolidone, N-acetyl-3-pyrrolidone, N-benzyl-3-pyrrolidone, formamide, N-methylformamide, N,N-dimethylformamide, N-ethylformamide, N,N-diethylformamide, acetamide, N-methylacetamide, N,N-dimethylacetamide, N-methylpropionamide and the like; aprotic, polar solvents such as dimethyl sulfoxide and the like; acetate solvents such as 2-methoxyethyl acetate, 2-ethoxyethyl acetate, 2-propoxyethyl acetate, 2-butoxyethyl acetate, 2-phenoxyethyl acetate, diethylene glycol monomethyl ether acetate, diethylene glycol monoethyl ether acetate, diethylene glycol monopropyl ether acetate, diethylene glycol monobutyl ether acetate and the like.

The above solvents can be used alone or in admixture of two or more.

In the synthesis reaction of the polycarbodiimide, the solvent is used in such a proportion that the concentration of all the organic isocyanate components in the reaction system becomes preferably 0.5 to 60% by weight, more preferably 5 to 50% by weight. When the concentration of all the organic isocyanate components is higher than 60% by weight, there is a fear that the polycarbodiimide produced may gel during the synthesis reaction. Also, when the concentration of all the organic isocyanate components is lower than 0.5% by weight, the reaction velocity becomes low and the productivity becomes low.

The temperature for the synthesis reaction of the polycarbodiimide may be appropriately varied depending upon the kinds of the organic isocyanate component and carbodiimidizing catalyst; however, it is preferably 20° to 200° C.

In the synthesis reaction of the polycarbodiimide, the total amount of the organic isocyanate components may be added at one time before the reaction or a part or all of the organic isocyanate components may be added continuously or in portions during the reaction.

In this invention, a compound capable of reacting with isocyanate group can be added at any reaction stage from the initial stage to the last stage of the synthesis reaction of the polycarbodiimide to block the terminal isocyanate groups of polycarbodiimide, thereby adjusting the molecular weight of the resulting polycarbodiimide. Also, said compound can be added in the last stage of the synthesis reaction of the polycarbodiimide to control the molecular weight of the polycarbodiimide obtained to the desired value.

Such a compound capable of reacting with isocyanate group includes alcohols such as methanol, ethanol, isopropanol, cyclohexanol and the like; and amines such as dimethylamine, diethylamine, benzylamine and the like.

The polycarbodiimide thus synthesized is, if necessary, separated from the solution. In this case, the separation of the polycarbodiimide can be effected by a method which comprises adding the polycarbodiimide solution to a nonsolvent inert to the polycarbodiimide and separating and collecting the resulting precipitate or oily matter by filtration or decantation; a method comprising spray-drying the solution to separate and collect the polycarbodiimide; a method comprising utilizing the temperature-dependency of the solubility of polycarbodiimide in the solvent used for the synthesis of the polycarbodiimide to separate and collect the polycarbodiimide, that is, when the polycarbodiimide is precipitated by lowering the temperature of the system in which the polycarbodiimide is dissolved in the solvent just after the synthesis, a method which comprises separating and collecting the polycarbodiimide from the resulting suspension by filtration or the like. Moreover, these separation and collection methods can be appropriately combined.

The polystyrene-reduced number average molecular weight determined by a gel permeation chromatography (GPC) of the polycarbodiimide in this invention (the number average molecular weight is referred to hereinafter as Mn) is preferably 400 to 500,000, more preferably 1,000 to 200,000 and particularly preferably 2,000 to 100,000.

<Reactive compound>

The reactive compound used in the synthesis of the modified polycarbodiimide is a compound having a graft-reactive group and a carboxylic anhydride group, and this compound may be an aromatic compound, aliphatic compound or cyclic compound. The cyclic compound may be a homocyclic compound or a heterocyclic compound. The graft-reactive group in the reactive compound means a group which reacts with the polycarbodiimide to produce a modified polycarbodiimide in which the reactive compound residue having a carboxylic anhydride group is grafted on the polycarbodiimide. Such a graft-reactive group may be a functional group having an active hydrogen atom, and, for example, a carboxyl group and a primary or secondary amino group are mentioned as the functional group.

In this reactive compound, at least one same or different graft-reactive group may be present and one or more carboxylic anhydride groups may be present.

Said reactive compound includes aromatic tricarboxylic anhydrides such as trimellitic anhydride, benzene-1,2,3-tricarboxylic anhydride, naphthalene-1,2,4-tricarboxylic anhydride, naphthalene-1,4,5-tricarboxylic anhydride, naphthalene-2,3,6-tricarboxylic anhydride, naphthalene-1,2,8-tricarboxylic anhydride, 4-(4-carboxybenzoyl)phthalic anhydride, 4-(4-(carboxyphenyl)phthalic anhydride, 4-(4-carboxyphenoxy)phthalic anhydride and the like; monoalkyl esters of aromatic tetracarboxylic monoanhydrides such as monomethyl ester of pyromellitic monoanhydride, monomethyl ester of 3,3',4,4'-benzophenonetetracarboxylic monoanhydride, monomethyl ester of 3,3',4,4'-biphenyltetracarboxylic monoanhydride and the like; aliphatic tricarboxylic anhydrides such as 3-carboxymethylglutaric anhydride, butane-1,2,4-tricarboxylic acid-1,2-anhydride, propene-1,2,3-tricarboxylic acid-1,2-anhydride and the like; aminoaromatic dicarboxylic anhydrides such as 3-amino-4-cyano-5-methylphthalic anhydride, 3-amino-4-cyano-5,6-diphenylphthalic anhydride, 3-methylamino-4-cyano-5-methylphthalic anhydride, 3-methylamino-4-cyano-5,6-diphenylphthalic anhydride and the like; and aminoaliphatic dicarboxylic anhydrides such as aminosuccinic anhydride, 4-amino-1,2-butanedicarboxylic anhydride, 4-aminohexahydrophthalic anhydride, N-methylaminosuccinic anhydride, 4-methylamino-1,2-butanedicarboxylic anhydride, 4-methylaminohexahydrophthalic anhydride and the like.

Among these reactive compounds, trimellitic anhydride is particularly preferable.

The above reactive compounds may be used alone or in admixture of two or more.

<Synthesis of modified polycarbodiimide>

A method for the synthesis of the modified polycarobodiimide is explained below.

The modified polycarbodiimide can be synthesized by grafting at least one reactive compound as mentioned above on a polycarbodiimide having a repeating unit represented by the general formula (1) mentioned above in the presence or absence of a suitable catalyst at an appropriate temperature (said grafting reaction is referred to hereinafter as the modification reaction). In this case, the polycarbodiimides can be used alone or in admixture of two or more.

The amount of the reactive compound used in the modification reaction can be varied depending upon the kinds of the polycarbodiimide and the reactive compound, and upon the use of the thermosetting resin composition of this invention and the like; however, the reactive compound is used in such an amount that the amount of the graft-reactive group in the reactive compound becomes preferably 0.01 to 1 mole, more preferably 0.02 to 0.8 mole, per mole of the repeating unit represented by the general formula (1) of the polycarbodiimide. When the amount of the graft-reactive group is less than 0.01 mole, there is a fear that a long term heating may be required for curing the finally obtained thermosetting resin composition and the effect of improving the storage stability of the resin composition in the form of a solution may become insufficient, and when the amount is more than 1 mole, there is a fear that the characteristics of the polycarbodiimide per se may be damaged. In the above-mentioned modification reaction, the reaction between the graft-reactive group in the reactive compound and the repeating unit represented by the general formula (1) of the polycarbodiimide proceeds quantitatively, and a graft reaction corresponding to the amount of the reactive compound consumed is achieved.

The modification reaction can be carried out even in the absence of a solvent; however, it is preferable to conduct the reaction in a suitable solvent. This solvent may be any solvent as far as it is inert to and can dissolve the polycarbodiimide and the reactive compound. Examples of the solvent include the above-mentioned ether solvents, amide solvents, ketone solvents, aromatic hydrocarbon solvents, aprotic, polar solvents and the like which are used in the synthesis of the polycarbodiimide. These solvents can be used alone or in admixture of two or more. When the solvent used in the synthesis of the polycarbodiimide can be used in the modification reaction, the polycarbodiimide solution obtained in the synthesis can be applied as it is to the modification reaction.

The amount of the solvent used in the modification reaction is preferably 10 to 10,000 parts by weight, more preferably 50 to 5,000 parts by weight, per 100 parts by weight in total of the starting materials for the reaction.

The temperature for the modification reaction can be varied depending upon the kinds of the polycarbodiimide and the reactive compound; however, the temperature is preferably not higher than 100° C., more preferably −10° to +80° C.

The Mn of the modified polycarbodiimide obtained in such a manner as mentioned above is preferably 500 to 1,000,000, more preferably 1,000 to 400,000 and most preferably 2,000 to 200,000.

The modified polycarbodiimide thus obtained is preferably used in the form of a solution in the preparation of the thermosetting resin composition of this invention; however, it is possible to use the same after the separation from the solution. The removal of the solvent from the modified polycarbodiimide obtained in the form of a solution in the synthesis can be carried out in the same manner as mentioned above as to the case of polycarbodiimide.

The modified polycarbodiimide used in this invention has such a structure that the graft-reactive group of the reactive compound has reacted with the repeating unit (—N=C=N—$R^1$—) of the polycarbodiimide whereby the reactive compound residue having a carboxylic anhydride group forms a graft on the polycarbodiimide. The modified polycarbodiimide is, therefore, essentially different in structure from the polycarbodiimide before the modification reaction. Therefore, the modified polycarbodiimide is different in properties from the polycarbodiimide before the modification reaction and hence has such characteristics that when it is mixed with an epoxy compound as mentioned hereinafter and the resulting mixture is heated, the mixture is easily cured usually at a temperature of 100° to 350° C., preferably 150° to 300° C. by the action of the carboxylic anhydride group in the modified polycarbodiimide without using any curing catalyst. In addition, the modified polycarbodiimide is easily dissolved in various solvents and is very good in storage stability in the form of a solution even in the presence of an epoxy compound. The curing characteristics of the resin composition comprising the modified polycarbodiimide and an epoxy compound and the storage stability of the modified polycarbodiimide and also the storage stability of a solution of a mixture of the modified polycarbodiimide with an epoxy compound can overcome the severe disadvantage of a conventional polycarbodiimide-based thermosetting resin composition and contributes greatly to an industry.

Epoxy compound

In this invention, the epoxy compound is a compound having at least one epoxy group in the molecule and this compound may have other functional groups than the epoxy group. The molecular weight of the epoxy compound is not critical, and may be, for example, 70 to 20,000.

Such epoxy compounds include, for example, glycidol, glycidyl acrylate, glycidyl methacrylate, 3,4-epoxycyclohexyl acrylate, 3,4-epoxycyclohexyl methacrylate, various epoxy resins and the like.

The epoxy compound is preferably an epoxy resin, and examples thereof include glycidyl ether type epoxy resins, representatives of which are bisphenol type epoxy resins, novolak type epoxy resins and cresol-novolak type epoxy resins; glycidyl ester type epoxy resins; aromatic glycidyl amine type epoxy resins; alicyclic epoxy resins; heterocyclic epoxy resins; and liquid rubber-modified epoxy resins.

The above-mentioned epoxy compounds can be used alone or in admixture of two or more.

The amount of the epoxy compound used is preferably 5 to 500 parts by weight, more preferably 10 to 300 parts by weight, per 100 parts by weight of the modified polycarbodiimide. When the amount of the epoxy compound used is less than 5 parts by weight, the curing velocity-improving effect tends to be decreased and when the amount is more than 500 parts by weight, the heat resistance of the cured product tends to become low.

Thermosetting resin composition

The thermosetting resin composition of this invention comprises the modified polycarbodiimide and the epoxy compound as the essential components, and if necessary, may contain various additives.

Said additives include, for example, antioxidants, heat-stabilizers, antistatic agents, flame-retardants, coloring agents, lubricants, antifogging agents, adhesiveness-improving agents, fungicides and the like.

Moreover, there can be compounded fillers such as clay, zeolite, talc, mica, silica, graphite, alumina, calcium carbonate, wollastonite and the like; reinforcing agents such as fibers or whiskers of glass, carbon, alumina, potassium titanate, aluminum borate, silicon carbide, silicon nitride, aromatic polyamides, polyamideimides, polyimides, aromatic polyesters, ultra-high-molecular-weight polyethylene, high-strength polyacrylonitrile, high-tenacity polyvinyl alcohol and the like. The above reinforcing agents can also be used in the form of a fabric such as woven fabric, non-woven fabric, knit fabric or the like which may be impregnated with the thermosetting resin composition.

The thermosetting resin composition of this invention has per se excellent curing characteristics, and if desired, may have compounded therewith a curing catalyst, a curing accelerator, a curing cocatalyst and the like which have a reactivity with the carbodiimide group and/or acid anhydride group in the modified polycarbodiimide or the epoxy group in the epoxy compound.

The thermosetting resin composition of this invention can be prepared by mixing the modified polycarbodiimide and the epoxy compound together with the various additives which are optionally used, in a suitable solvent, or kneading the modified polycarbodiimide taken out as a solid from its solution and the epoxy compound together with the various additives which are optionally used, in the absence of a solvent while optionally heating them.

The solvent which is optionally used in the preparation of the thermosetting resin composition may be any solvent as far as it is inert to and can dissolve the modified polycarbodiimide and the epoxy compound. Such solvents include, for example, the above-mentioned ether solvents, amide solvents, ketone solvents, aromatic hydrocarbon solvents, aprotic, polar solvents and the like which are used in the synthesis of the polycarbodiimide. These solvents can be used alone or in admixture of two or more.

The amount of the solvent used in the preparation of the thermosetting resin composition is preferably 10 to 10,000 parts by weight, more preferably 20 to 5,000 parts by weight, per 100 parts by weight in total of the modified polycarbodiimide and the epoxy compound.

The thermosetting resin composition of this invention may be used in the form of a solution or may be used in the form of a mixture as obtained by mixing in the absence of a solvent.

Characteristics and uses of the thermosetting resin composition

The thermosetting resin composition of this invention has, as stated above, excellent curing characteristics, excellent solubility in various solvents and storage stability in the form of a solution, and in addition, the cured product obtained therefrom is excellent in transparency, electrical insulation properties, chemical stability, heat resistance, mechanical characteristics and the like, and is also low in water absorption properties and excellent in humidity resistance and adhesiveness to various substrates.

Accordingly, the thermosetting resin composition of this invention can be used particularly suitably in a protective film or electrical insulation film for various electrical apparatuses and electronic parts, and in addition, is useful as an adhesive or paint requiring heat resistance. Also, a heat-curable film can be obtained from the thermosetting resin composition of this invention by applying the composition to a suitable substrate which has previously been subjected to release-treatment, to form a heat-curable film and forcibly releasing the film from the substrate. Said heat-curable film is useful as a heat resistant, adhesive film or the like for electrical apparatuses, electronic parts and the like. Alternatively, a cured film can be obtained by curing the heat-curable film which has been forcibly released from the above-mentioned substrate or heat-curing the heat-curable film on a suitable substrate which has previously been subjected to release-treatment and thereafter forcibly releasing the resulting cured film from the substrate. Furthermore, a prepreg obtained by impregnating a suitable fabric such as a glass cloth or the like with a solution of the thermosetting resin composition of this invention and then drying the impregnated fabric or a prepreg obtained by impregnating a suitable fabric such as a glass cloth or the like with the thermosetting resin composition free from a solvent is useful as a laminating material for a copper-clad laminate or the like, and the above thermosetting resin composition in the form of a powder, pellet or the like is useful as a heat-curable molding material.

The substrate which can be used in the forming of a heat-curable film or a cured film from the thermosetting resin composition of this invention is not critical, and includes, for example, metals such as iron, nickel, stainless steel, titanium, aluminum, copper, various alloys and the like; ceramics such as silicon nitride, silicon carbide, sialon, aluminum nitride, boron nitride, boron carbide, zirconium oxide, titanium oxide, alumina, silica, mixtures thereof and the like; semiconductors such as Si, Ge, SiC, SiGe, GaAs and the like; ceramic materials such as glass, pottery and the like; and heat resistant resins such as aromatic polyamides, polyamideimides, polyimides, all aromatic polyesters and the like.

The above-mentioned substrate may, if necessary, be previously subjected to release-treatment and also to a suitable pretreatment such as a chemical treatment with a silane-coupling agent, titanium-coupling agent or the like, plasma-treatment, ion plating, sputtering, gas phase reaction or vacuum deposition.

When the above substrate is coated with the thermosetting resin composition of this invention, the composition may be, if necessary, formed into a solution and a suitable coating means may be adopted such as a spin coating method, a roll coating method, a cast coating method, an immersion coating method, a spray coating method or the like. The coating film thickness can be appropriately controlled by selecting a coating means or adjusting the solid concentration and viscosity of the composition solution.

The thickness of a heat-curable film formed from the thermosetting resin composition of this invention or the thickness of a cured film may be varied adequately, and is preferably 0.1 to 10,000 μm, more preferably 1 to 1,000 μm.

Moreover, the thermosetting resin composition of this invention in the form of a solvent-free mixture or in the form of a solid separated from its solution may be molded by a known molding method such as an injection molding method, a transfer molding method, an extrusion molding method, a compression molding method or the like and various industrial articles or parts or the like thus obtained can be used.

The thermosetting resin composition of this invention retains the heat resistance, electrical insulation properties, mechanical properties and the like characteristic of polycarbodiimide, is excellent in solubility in various solvents and storage stability in the form of a solution, can be easily cured under mild conditions without using a curing catalyst, and can give a cured article excellent in humidity resistance, transparency, chemical stability, adhesiveness to various substrates, and the like.

Accordingly, the thermosetting resin composition of this invention can be very appropriately used as a protective film or electrical insulation film for an electrical apparatus, electronic part or the like and is useful for an adhesive, a paint, a heat-curable film, a cured film, a prepreg, a cured molded article and the like.

DESCRIPTION OF THE PREFERRED EMBODIMENTS

Examples are shown below to explain this invention in more detail. However, this invention should not be construed to be limited to the Examples.

EXAMPLE 1

Synthesis of polycarbodiimide

In the presence of 0.044 g of 1-phenyl-3-methyl-2-phospholene-1-oxide, 50 g of diphenylmethane-4,4'-diisocyanate (MDI) was reacted with 3.1 g of phenyl isocyanate in 200 g of cyclohexanone at 80° C. for 4 hours, to obtain a solution of a polycarbodiimide (P-MDI) (Mn=3,500).

Synthesis of modified polycarbodiimide

To the above-mentioned polycarbodiimide solution was added 3.8 g of trimellitic anhydride as the reactive compound and the mixture was subjected to reaction at 20° C. for 3 hours, to obtain a solution of a modified polycarbodiimide having an Mn of 3,800.

As a result of measurement by an infrared spectrometer, it was confirmed that the modified polycarbodiimide had an infrared absorption characteristic of the carbodiimide unit (wave number: 2,150-2,100 cm$^{-1}$) and an infrared absorption characteristic of the carboxylic anhydride (wave number: 1,850-1,780 cm$^{-1}$).

Preparation of thermosetting resin composition

To the above modified polycarbodiimide solution was added an epoxy resin consisting of a diglycidyl ether derivative of bisphenol A (Epikote 828, a trade name of Yuka-Shell Epoxy Co., Ltd.) (the epoxy resin is referred to hereinafter as the resin a) as the epoxy compound in a proportion of 20 g per 20 g of the modified polycarbodiimide solid content in the solution, and thereafter, the resulting mixture was filtered through a filter having a pore diameter of 1 μm under pressure, after which cyclohexanone was added so that the total solids concentration of the thermosetting resin composition became 20% by weight based on the weight of the solution, to prepare a thermosetting resin composition solution.

Formation of cured film

The above thermosetting resin composition solution was spin-coated on a glass substrate which had been previously subjected to release-treatment, by means of a spinner to form a heat-curable film, and the resulting assembly was heated at 200° C. for 15 minutes to cure the film. Subsequently, the resulting cured film was peeled forcibly from the substrate to obtain a cured film having a film thickness of 50 μm.

Evaluation

Storage stability of solution: The thermosetting resin composition solution was stored at room temperature, and whether or not the solution viscosity was changed and whether or not the appearance was changed were observed, and based thereon, the storage stability was evaluated. The viscosity was measured by a B type rotational viscometer.

The thermosetting resin composition solution obtained in Example 1 had a solution viscosity of 30 cP at the start of storage and also after a 3-month storage, that is, the viscosity was not changed. Also, even after a lapse of 3 months, the solution did not show such an appearance change as gelation or the like and was stored stably.

Tensile strength: The tensile strength of the cured film was measured according to JIS K6911 or C2318.

5% weight loss temperature: The 5% weight reduction temperature of the cured film was measured by a thermogravimetric analyzer (TGA) at a temperature-elevating rate of 10° C./min in air.

Moist heat resistance test: The cured film was subjected to a moist heat resistance test (PCT: pressure cooker test) under the conditions of 121° C., a humidity of 100% and a pressure of 2 atm. Before and after the above test, measurement by an infrared spectrometer was conducted and the moist heat resistance was evaluated based on whether or not a change was found. The case where no change was found and resistance was confirmed was judged as resistant ("good"-"fair") and the case where a large change was found and resistance was not confirmed was judged as not resistant ("bad").

The evaluation results obtained are shown in Table 1.

EXAMPLES 2 TO 4

Preparation of thermosetting resin composition solution

The same procedure as in Example 1 was repeated, except that the amount of the epoxy compound used was changed as shown in Table 1, to prepare thermosetting resin composition solutions.

Formation of cured film

In the same manner as in Example 1, a cured film having a film thickness of 50μ was formed from each of the thermosetting resin composition solutions.

Evaluation

In the same manner as in Example 1, each of the thermosetting resin composition solutions and each of the cured films were evaluated.

The evaluation results obtained are shown in Table 1.

EXAMPLES 5 TO 7

Synthesis of modified polycarbodiimide

The same procedure as in Example 1 was repeated, except that the amount of the reactive compound used was changed as shown in Table 1, to obtain modified polycarbodiimide solutions. The Mn of each of the modified polycarbodiimides and the amounts of the reactive compound used are shown in Table 1.

Preparation of thermosetting resin composition solution

In the same manner as in Example 1, except that each of the above modified polycarbodiimide was used, thermosetting resin composition solutions were prepared.

Formation of cured film

In the same manner as in Example 1, a cured film having a film thickness of 50 μm was formed from each of the thermosetting resin composition solutions obtained above.

Evaluation

In the same manner as in Example 1, each of the thermosetting resin composition solutions and each of the cured films were evaluated.

The evaluation results obtained are shown in Table 1.

COMPARATIVE EXAMPLE 1

Preparation of thermosetting resin composition

The same procedure as in Example 1 was repeated, except that the polycarbodiimide solution obtained in Example 1 was substituted for the modified polycarbodiimide solution, to prepare a thermosetting resin composition solution.

Formation of cured film

In the same manner as in Example 1, a cured film having a film thickness of 50 μm was formed from the thermosetting resin composition solution obtained above.

Evaluation

In the same manner as in Example 1, the thermosetting resin composition solution and the cured film were evaluated.

The evaluation results obtained are shown in Table 1.

TABLE 1

| | | Example | | | | | | | Comp. Example |
|---|---|---|---|---|---|---|---|---|---|
| Item | | 1 | 2 | 3 | 4 | 5 | 6 | 7 | 1 |

Modified

TABLE 1-continued

| Item | Example | | | | | | | Comp. Example |
|---|---|---|---|---|---|---|---|---|
| | 1 | 2 | 3 | 4 | 5 | 6 | 7 | 1 |
| polycarbodiimide | | | | | | | | |
| Polycarbodiimide | P-MDI | P-MDI | P-MDI | P-MDI | P-MDI | P-MDI | P-MDI | P-MDI |
| Reactive compound | TMAAH | TMAAH | TMAAH | TMAAH | TMAAH | TMAAH | TMAAH | — |
| Amount (#1) | 0.1 | 0.1 | 0.1 | 0.1 | 0.05 | 0.3 | 0.5 | — |
| Mn (#2) | 3800 | 3800 | 3800 | 3800 | 3600 | 4400 | 5100 | 3500 |
| Amount (g) | 20 | 20 | 20 | 20 | 20 | 20 | 20 | 20 |
| Epoxy compound | Resin a | Resin a | Resin a | Resin a | Resin a | Resin a | Resin a | Resin a |
| Amount (g) (#3) | 20 | 2 | 10 | 40 | 20 | 20 | 20 | 20 |
| Storage stability of solution (room temp.) | ≧3 months | ≧3 months | ≧3 months | ≧2 months | ≧3 months | ≧2 months | ≧2 months | ≧3 days |
| Tensile strength (kgf/cm$^2$) | 1200 | 1400 | 1300 | 1200 | 1100 | 1200 | 1300 | 150 |
| 5% weight loss temperature (°C.) | 390 | 460 | 420 | 350 | 390 | 400 | 410 | 450 |
| Resistance in moist heat resistance test (#4) | good | bad | bad | bad | fair | good | good | bad |

(#1) · TMAAH refers to trimellitic anhydride.
· The amount is the number of moles of graft-reactive group in reactive compound per mole of repeating unit of general formula (1).
(#2) · Mn in comparative Example 1 is of polycarbodiimide.
(#3) · Resin a is diglycidyl ether derivative of bisphenol A.
(#4) · Change in infrared absorption spectrum before and after the test.

EXAMPLE 8

Synthesis of polycarbodiimide

In 200 g of cyclohexanone, 50 g of tolylene diisocyanate (TDI) was reacted with 2.3 g of phenyl isocyanate in the presence of 0.29 g of 1-phenyl-3-methyl-2-phospholene-1-oxide at 80° C. for 4 hours, to obtain a solution of a polycarbodiimide (P-TDI) (Mn=3,800).

Synthesis of modified polycarbodiimide

To the above polycarbodiimide solution was added 5.5 g of trimellitic anhydride, and the mixture was subjected to reaction at 20° C. for 3 hours to obtain a solution of a modified polycarbodiimide having an Mn of 4,300.

As a result of measurement by an infrared spectrometer, it was confirmed that the modified polycarbodiimide had an infrared absorption characteristic of the carbodiimide unit (wave number: 2,150-2,100 cm$^{-1}$) and an infrared absorption characteristic of the carboxylic anhydride (wave number: 1,850-1,780 cm$^{-1}$).

Preparation of thermosetting resin composition solution

The same procedure as in Example 1 was repeated, except that the above modified polycarbodiimide solution was used, to prepare a thermosetting resin composition solution.

Formation of cured film

In the same manner as in Example 1, a cured film having a film thickness of 50 μm was formed from the thermosetting resin composition solution obtained.

The evaluation results obtained are shown in Table 2.

EXAMPLE 9

Synthesis of polycarbodiimide

In the presence of 1.8 g of 1-phenyl-3-methyl-2-phospholene-1-oxide, 50 g of dicyclohexylmethane-4,4'-diisocyanate (HMDI) was subjected to reaction at 180° C. for 8 hours, and then cooled to obtain a solid polycarbodiimide (P-HMDI) (Mn=5,000).

Synthesis of modified polycarbodiimide

The above polycarbodiimide was dissolved in 200 ml of anisole and then 3.7 g of trimellitic anhydride was added to the resulting solution, after which the resulting mixture was subjected to reaction at 20° C. for 3 hours, to obtain a solution of a modified polycarbodiimide having an Mn of 5,400.

As a result of measurement by an infrared spectrometer, it was confirmed that the modified polycarbodiimide had an infrared absorption characteristic of the carbodiimide unit (wave number: 2,150-2,100 cm$^{-1}$) and an infrared absorption characteristic of the carboxylic anhydride (wave number: 1,850-1,780 cm$^{-1}$).

Preparation of thermosetting resin composition

The same procedure as in Example 1 was repeated, except that the above modified polycarbodiimide solution was used, to prepare a thermosetting resin composition solution.

Formation of cured film

In the same manner as in Example 1, a cured film having a film thickness of 50 μm was formed from the above thermosetting resin composition solution.

Evaluation

In the same manner as in Example 1, the above thermosetting resin composition solution and the above cured film were evaluated.

The evaluation results obtained are shown in Table 2.

COMPARATIVE EXAMPLE 2

Preparation of thermosetting resin composition solution

The same procedure as in Example 1 was repeated, except that the polycarbodiimide solution obtained in Example 8 was substituted for the modified polycarbodiimide solution, to prepare a thermosetting resin composition solution.
Formation of cured film In the same manner as in Example 1, a cured film having a film thickness of 50 μm was formed from the above thermosetting resin composition solution.
Evaluation In the same manner as in Example 1, the thermosetting resin composition solution and the cured film were evaluated.

The evaluation results obtained are shown in Table 2.

COMPARATIVE EXAMPLE 3

Preparation of thermosetting resin composition solution

The same procedure as in Example 1 was repeated, except that the solution of polycarbodiimide in anisole obtained in Example 9 was substituted for the modified polycarbodiimide solution, to prepare a thermosetting resin composition solution.
Formation of cured film In the same manner as in Example 1, a cured film having a film thickness of 50 μm was formed from the above thermosetting resin composition solution.
Evaluation In the same manner as in Example 1, the thermosetting resin composition solution and the cured film were evaluated.

The evaluation results obtained are shown in Table 2.

TABLE 2

| | Example | | Comp. Example | |
|---|---|---|---|---|
| Item | 8 | 9 | 2 | 3 |
| Modified polycarbodimide | | | | |
| Polycarbodimide | P-TDI | P-HMDI | P-TDI | P-HMDI |
| Reactive compound | TMAAH | TMAAH | — | — |
| Amount (#1) | 0.1 | 0.1 | — | — |
| Mn (#2) | 4300 | 5400 | 3800 | 5000 |
| Amount (g) | 20 | 20 | 20 | 20 |
| Epoxy compound | Resin a | Resin a | Resin a | Resin a |
| Amount (g) (#3) | 20 | 20 | 20 | 20 |
| Storage stability of solution (room temp.) | ≧3 months | ≧3 months | ≧3 days | ≧3 days |
| Tensile strength (kgf/cm²) | 1300 | 1100 | 150 | 110 |
| 5% weight loss temperature (°C.) | 380 | 350 | 450 | 470 |

(#1) · TMAAH refers to trimellitic anhydride.
· The amount is the number of moles of graft-reactive group in reactive compound per mole of repeating unit of general formula (1).
(#2) · Mn in Comparative Examples is of polycarbodiimide.
(#3) · Resin a is diglycidyl ether derivative of bisphenol A.

EXAMPLE 10

Synthesis of polycarbodiimide

In 200 g of toluene, 50 g of diphenylmethane-4,4'-diisocyanate (MDI) was reacted with 3.1 g of phenyl isocyanate in the presence of 0.044 g of 1-phenyl-3-methyl-2-phospholene-1-oxide at 110° C. under reflux for 5 hours, to obtain a solution of a polycarbodiimide (P-MDI). This solution was cooled to room temperature to precipitate the polycarbodiimide and subjected to filtration to obtain a powder of a polycarbodiimide having an Mn of 9,800.
Synthesis of modified polycarbodiimide In 120 g of toluene was dissolved 30 g of the above polycarbodiimide powder with heating, and a solution of 2.8 g of trimellitic anhydride in 12 g of acetone was dropwise added thereto as the reactive compound at 80° C. over 30 minutes. The resulting mixture was subjected to reaction for another 30 minutes, then cooled to room temperature to precipitate the reaction product and thereafter subjected to filtration to obtain a powder of a modified polycarbodiimide having an Mn of 4,500.

As a result of measurement by an infrared spectrometer, it was confirmed that the above modified polycarbodiimide had an infrared absorption characteristic of the carbodiimide unit (wave number: 2,150-2,100 cm$^{-1}$) and an infrared absorption characteristic of the carboxylic anhydride (wave number: 1,850-1,780 cm$^{-1}$).
Preparation of thermosetting resin composition solution The same procedure as in Example 1 was repeated, except that a solution of 20 g of the above modified polycarbodiimide powder in 160 g of cyclohexanone was substituted for the modified polycarbodiimide solution, to prepare a thermosetting resin composition solution.
Formation of cured film The same procedure as in Example 1 was repeated, except that the above thermosetting resin composition solution was used and the curing was effected by heating at 200° C. for 30 minutes, to form a cured film having a film thickness of 50 μm.
Evaluation In the same manner as in Example 1, the above thermosetting resin composition and the above cured film were evaluated.

Before and after the PCT environmental test (allowed to stand at 121° C. at a 100% humidity for 240 hours), volume resistivity and surface resistivity were evaluated according to JIS K6911.

Also, electrolytic corrosion test was conducted in the following manner:

Electrolytic corrosion test:

(1) Preparation of a substrate for electrolytic corrosion test: Using a copper-clad glass epoxy substrate (R-1705SX, a trade name of Matsushita Electric Works, Ltd.), a comb-shaped electrode having a copper thickness of 13 μm and a pitch of 200 μm (copper line width/space=100 μm/100 μm) was produced as a lower electrode by a photolithographic etching. This electrode was spin-coated with the above thermosetting resin composition by a spinner to form a heat-curable film, after which the film was dried at 120° C. for 1 hour and heated at 150° C. for 30 minutes and then at 200° C. for 30 minutes to cure the film, thereby laminating a cured film having a film thickness of 50 μm to the electrode. A copper layer (thickness of 2 μm) was coated on the cured film by a sputtering method and subjected to pattern-etching in the desired shape, thereby forming the upper electrode. The resulting assembly was used as the electrolytic corrosion test substrate.

(2) Electrolytic corrosion test: The above electrolytic corrosion test substrate was placed in a pressure-resistant, constant temperature vessel (HAST SYSTEM TPC-212, a trade name of Tabai Espec Co., Ltd.) and the current was measured under the conditions of 133° C., 3 atm. and a bias voltage of 5 V using an ultra high resistance meter R8340A (manufactured by Advantest Co., Ltd.) to determine the time taken until the current became more than 1 μA.

The evaluation results obtained are shown in Table 3.

EXAMPLE 11

Synthesis of modified polycarbodiimide

In 120 g of cyclohexanone was dissolved 30 g of the polycarbodiimide powder obtained in Example 10 with heating, and a solution of 2.8 g of trimellitic anhydride in 12 g of acetone was dropwise added thereto as the reactive compound over 30 minutes while the temperature of the reaction system was kept at 80° C. The mixture was further subjected to reaction for 30 minutes to obtain a solution of a modified polycarbodiimide having an Mn of 6,500.

As a result of measurement by an infrared spectrometer, it was confirmed that the modified polycarbodiimide had an infrared absorption characteristic of the carbodiimide unit (wave number: 2,150-2,100 $cm^{-1}$) and an infrared absorption characteristic of the carboxylic anhydride (wave number: 1,850-1,780 $cm^{-1}$).

Preparation of thermosetting resin composition

The same procedure as in Example 10 was repeated, except that the above modified polycarbodiimide solution was use, to prepare a thermosetting resin composition solution.

Formation of cured film

In the same manner as in Example 10, a cured film having a film thickness of 50 μm was formed from the above thermosetting resin composition solution.

Evaluation

In the same manner as in Example 10, the above thermosetting resin composition solution and the above cured film were evaluated.

The evaluation results obtained are shown in Table 3.

EXAMPLE 12

Preparation of thermosetting resin composition

In the absence of solvent, 20 g of the modified polycarbodiimide powder was kneaded with 20 g of an epoxy resin (the resin a) at 70° C., to prepare a pasty thermosetting resin composition.

Formation of plate-like cured product

The above thermosetting resin composition was heated as it was at 120° C. for 60 minutes, to obtain a sheet-like to film-like precured product. This precured product was pressure-molded at 150° C. for 30 minutes and then at 200° C. for 30 minutes to prepare a plate-like cured product having a thickness of 3 mm.

Preparation of electrolytic corrosion test substrate

The same procedure as in the electrolytic corrosion test in Example 10 was repeated, except that in place of the formation of a heat-curable film by a spinner, the above precured product was put on the electrode, and the resulting assembly was cured in such a state that a load of 5 kg/$cm^2$ was applied to the assembly through a polyethylene terephthalate film which had been previously subjected to release-treatment (Luminer, a trade name of TORAY INDUSTRIES, INC.), to prepare an electrolytic corrosion test substrate.

Evaluation

Various physical properties of the plate-like cured product were evaluated according to the ASTM specification or the JIS specification. Also, the above electrolytic corrosion test substrate was subjected to electrolytic corrosion test in the same manner as in Example 10.

The evaluation results obtained are shown in Table 4.

COMPARATIVE EXAMPLES 4 AND 5

Preparation of thermosetting resin composition solution

The same procedure as in Example 10 was repeated, except that the epoxy resin (the resin a) was not used (Comparative Example 4) or a polycarbodiimide was used (Comparative Example 5), to prepare thermosetting resin composition solutions.

Formation of cured film

In the same manner as in Example 10, a cured film having a film thickness of 50 μm was formed from each of the above thermosetting resin composition solutions.

Evaluation

In the same manner as in Example 10, the above thermosetting resin composition solutions and the cured films were evaluated.

The evaluation results obtained are shown in Table 3.

TABLE 3

| Item | Example 10 | Example 11 | Comp. Example 4 | Comp. Example 5 |
|---|---|---|---|---|
| Modified polycarbodiimide | | | | |
| Polycarbodimide | P-MDI | P-MDI | P-MDI | P-MDI |
| Reactive compound | TMAAH | TMAAH | TMAAH | — |
| Amount (#1) | 0.1 | 0.1 | 0.1 | — |
| Mn (#2) | 4500 | 6500 | 4500 | 9800 |
| Amount (g) | 20 | 20 | 20 | 20 |
| Epoxy compound | Resin a | Resin a | — | Resin a |
| Amount (g) (#3) | 20 | 20 | — | 20 |
| Storage stability of solution (room temp.) | ≧3 months | ≧3 months | ≧3 months | 2 weeks |
| Tensile strength (kgf/$cm^2$) | 1200 | 1100 | 600 | 300 |
| 5% weight loss temperature (°C.) | 370 | 380 | 430 | 300 |
| Before PCT test Volume resistivity (Ω · cm) | $10^{16}$ | $10^{16}$ | $10^{16}$ | $10^{14}$ |
| Surface resistivity (Ω) | $10^{15}$ | $10^{15}$ | $10^{15}$ | $10^{13}$ |
| After PCT test Volume resistivity (Ω · cm) | $10^{15}$ | $10^{15}$ | $10^{12}$ | $10^{10}$ |
| Surface resistivity (Ω) | $10^{14}$ | $10^{14}$ | $10^{11}$ | $10^{10}$ |
| Electrolytic corrosion test (hrs) (#5) | ≧240 | ≧240 | 48 | 24(#6) |

(#1) · TMAAH refers to trimellitic anhydride.
· The amount is the number of moles of graft-reactive group in reactive compound per mole of repeating unit of general formula (1).
(#2) · Mn in Comparative Example 5 is of polycarbodiimide.
(#3) · Resin a is diglycidyl ether derivative of bisphenol A.
(#5) · Time required until the current becomes 1 μA.
(#6) · Peeling from substrate.

TABLE 4

| Item | Example 12 |
|---|---|
| Modified polycarbodiimide | |
| Polycarbodiimide | P-MDI |
| Reactive compound | TMAAH |
| Amount (#1) | 0.1 |
| Mn | 4500 |
| Amount (g) | 20 |
| Epoxy compound | Resin a |
| Amount (g) (#3) | 20 |
| | Evaluation specification |

TABLE 4-continued

| | | |
|---|---|---|
| Water absorption (wt. %) | 0.3 | ASTM D570 |
| Tensile strength (kgf/cm$^2$) | 590 | ASTM D638 |
| Flexural strength (kgf/cm$^2$) | 1040 | ASTM D790 |
| Izod impact strength (kgfcm/cm)(#7) | 5.5 | ASTM D256 |
| Copperfoil-peeling strength (kgf/cm) | 1.8 | JIS C6481 |
| Volume resistivity (Ω · cm) | 10$^{16}$ | ASTM D257 |
| Surface resistivity (Ω) | 10$^{16}$ | ASTM D257 |
| Electrolytic corrosion test (hrs)(#5) | ≧240 | |

(#1) · TMAAH refers to trimellitic anhydride.
· The amount is the number of moles of graft-reactive group in reactive compound per mole of repeating unit of general formula (1).
(#3) · Resin a is diglycidyl ether derivative of bisphenol A.
(#5) · The time required until current becomes more than 1 µA.
(#7) · Notched

EXAMPLE 13

Preparation of thermosetting resin composition solution

In 30 g of cyclohexanone was dissolved 20 g of the modified polycarbodiimide powder obtained in Example 10 with heating, and thereafter, 20 g of an epoxy resin (the resin a) was added to the solution, to prepare a thermosetting resin composition solution.

Preparation of adhesive film

The above thermosetting resin composition solution was coated on a polyethylene terephthalate film which had been previously subjected to release-treatment, by use of a doctor blade having a gap of 300 µm and then heated on a hot plate at 80° C. for 20 minutes and then at 120° C. for 60 minutes. Subsequently, the assembly was cooled to room temperature and the resulting curable film having a thickness of about 32 µm was peeled from the polyethylene terephthalate film, to prepare an adhesive film.

Evaluation of adhesiveness

The above adhesive film was inserted between a polyimide film having a thickness of 130 µm (Kapton, a trade name of Toray-DuPont Co., Ltd.) and the copper surface of the above copper-clad glass epoxy substrate, and the resulting assembly was heated under a load of 100 g/cm$^2$ at 150° C. for 30 minutes and then at 200° C. for 60 minutes. Subsequently, the peeling strength of the polyimide film from the copper surface was measured according to JIS H8630 and C6481 using a bonding strength tester (manufactured by Yamamoto Mekki Shikenki). It was 1.8 kgf/cm.

EXAMPLE 14

Preparation of laminate adhesive film

The thermosetting resin composition solution obtained in Example 13 was coated on the polyimide surface of a copper foil-laminated polyimide film (IFI-RM10, a trade name of Nikkan Kogyo K. K.) by means of a doctor blade having a gap of 500 µm, thereafter heated on a hot plate at 80° C. for 20 minutes and then at 120° C. for 60 minutes, to prepare a laminate adhesive film having a thermosetting resin layer having a thickness of about 50 µm.

Evaluation of adhesiveness

The above laminate adhesive film was placed on the above-mentioned copper-clad glass epoxy substrate so that the thermosetting resin layer faced the substrate, and the resulting assembly was heated under a load of 100 g/cm$^2$ at 150° C. for 30 minutes and then at 200° C. for 60 minutes. Subsequently, the peeling strength of the copper foil-laminated polyimide film from the copper surface of the copper-clad glass epoxy substrate was measured. It was 1.9 kgf/cm.

EXAMPLE 15

Preparation of adhesive film

The same procedure as in Example 13 was repeated, except that the thermosetting resin composition solution obtained in Example 11 was used, to prepare an adhesive film having a thickness of about 35 µm.

Evaluation of adhesiveness

The adhesiveness was evaluated in the same manner as in Example 13.

The evaluation results obtained are shown in Table 5.

EXAMPLE 16

Preparation of laminate adhesive film

The same procedure as in Example 14 was repeated, except that the thermosetting resin composition solution obtained in Example 11 was used to prepare a laminate adhesive film having a thermosetting resin layer having a thickness of about 52 µm.

Evaluation of adhesiveness

The adhesiveness was evaluated in the same manner as in Example 14.

The evaluation results obtained are shown in Table 5.

EXAMPLE 17

Preparation of adhesive film

The pasty thermosetting resin composition obtained in Example 12 was sandwiched in between two sheets of a polyethylene terephthalate film which had previously been subjected to release-treatment, and the resulting assembly was heated at 120° C. for 60 minutes with pressing at a pressure of 5 kg/cm$^2$. Subsequently, the assembly was cooled to room temperature, and thereafter, the resulting curable film was peeled from the polyethylene terephthalate film, to prepare an adhesive film having a thickness of about 150 µm.

Evaluation of adhesiveness

The adhesiveness was evaluated in the same manner as in Example 13.

The evaluation results obtained are shown in Table 5.

EXAMPLE 18

Preparation of laminate adhesive film

The pasty thermosetting resin composition obtained in Example 12 was placed on the above copper foil-laminated polyimide film, and the resulting assembly was sandwiched between two sheets of the above polyethylene terephthalate film which had previously been subjected to release-treatment. The resulting assembly was heated at 120° C. for 60 minutes with pressing at a pressure of 5 kg/cm$^2$. Subsequently, the assembly was cooled to room temperature and then the polyethylene terephthalate film was peeled, to obtain a laminate adhesive film having a thermosetting resin layer having a thickness of about 120 µm.

Evaluation of adhesiveness

The adhesiveness was evaluated in the same manner as in Example 14.

The evaluation results obtained are shown in Table 5.

COMPARATIVE EXAMPLES 6 AND 7

The same procedure as in Example 14 was repeated, except that the thermosetting resin composition solution obtained in Comparative Example 4 or Comparative Example 5 was use, to prepare a laminate adhesive film having a thermosetting resin layer having a thickness of about 18 μm or about 42 μm, respectively.

Evaluation of adhesiveness

The adhesiveness was evaluated in the same manner as in Example 14.

The evaluation results obtained are shown in Table 5.

TABLE 5

| Item | Example | | | | Comp. Example | |
| --- | --- | --- | --- | --- | --- | --- |
| | 15 | 16 | 17 | 18 | 6 | 7 |
| Modified polycarbodiimide | | | | | | |
| Polycarbodiimide | P-MDI | P-MDI | P-MDI | P-MDI | P-MDI | P-MDI |
| Reactive compound | TMAAH | TMAAH | TMAAH | TMAAH | TMAAH | — |
| Amount (#1) | 0.1 | 0.1 | 0.1 | 0.1 | 0.1 | — |
| Mn (#2) | 6500 | 6500 | 4500 | 4500 | 4500 | 9800 |
| Amount (g) | 20 | 20 | 20 | 20 | 20 | 20 |
| Epoxy compound | Resin a | Resin a | Resin a | Resin a | — | Resin a |
| Amount (g) (#3) | 20 | 20 | 20 | 20 | — | 20 |
| Peeling strength (kgf/cm) | 1.9 | 2.2 | 1.7 | 1.8 | 1.0 | 1.2 |

(#1) · TMAAH refers to trimellitic anhydride.
· The amount is the number of moles of graft-reactive group in reactive compound per mole of the repeating unit of general formula (1).
(#2) · Mn in Comparative Example 7 is of polycarbodiimide.
(#3) · Resin a is diglycidyl ether derivative of bisphenol A.

What is claimed is:

1. A thermosetting resin composition which comprises:
   (A) a resin in which at least one compound having a graft-reactive group and a carboxylic anhydride group has been grafted on a polycarbodiimide having a repeating unit represented by the general formula (1):

$$-N=C=N-R^1- \quad (1)$$

wherein $R^1$ represents a divalent organic group, and
   (B) an epoxy compound.

2. The thermosetting resin composition according to claim 1, wherein the polycarbodiimide is one obtained by reacting an organic polyisocyanate in the presence of a catalyst which accelerates the carbodiimidization of the isocyanate group.

3. The thermosetting resin composition according to claim 2, wherein the organic polyisocyanate is at least one organic diisocyanate.

4. The thermosetting resin composition according to claim 3, wherein the organic diisocyanate is an isocyanate prepolymer having isocyanate groups at both ends.

5. The thermosetting resin composition according to claim 1, wherein the polycarbodiimide has a polystyrene-reduced number average molecular weight Mn of 400 to 500,000 as determined by a gel permeation chromatography.

6. The thermosetting resin composition according to claim 1, wherein the compound having a graft-reactive group and a carboxylic anhydride group is a compound which reacts with the polycarbodiimide through the graft-reactive group.

7. The thermosetting resin composition according to claim 1, wherein the graft-reactive group is a functional group having an active hydrogen atom.

8. The thermosetting resin composition according to claim 1, wherein the graft-reactive group is selected from the group consisting of a carboxyl group, a primary amino group and a secondary amino group.

9. The thermosetting resin composition according to claim 1, wherein the compound having a graft-reactive group and a carboxylic anhydride group is at least one member selected from the group consisting of aromatic tricarboxylic anhydrides, monoalkyl esters of aromatic tetracarboxylic monoanhydrides, aliphatic tricarboxylic anhydrides, aminoaromatic dicarboxylic anhydrides and aminoaliphatic dicarboxylic anhydrides.

10. The thermosetting resin composition according to claim 1, wherein the compound having a graft-reactive group and a carboxylic anhydride group is an aromatic tricarboxylic anhydride.

11. The thermosetting resin composition according to claim 1, wherein the compound having a graft-reactive group and a carboxylic anhydride group is trimellitic anhydride.

12. The thermosetting resin composition according to claim 1, wherein the amount of the compound having a graft-reactive group and a carboxylic anhydride group used is such that the amount of the graft-reactive group of the compound is 0.01 to 1 mole per mole of the repeating unit of the general formula (1) of the polycarbodiimide.

13. The thermosetting resin composition according to claim 1, wherein the grafting of the compound having a graft-reactive group and a carboxylic anhydride group on the polycarbodiimide is effected in the presence of a solvent.

14. The thermosetting resin composition according to claim 1, wherein the grafting of at least one compound having a graft-reactive group and a carboxylic anhydride group on the polycarbodiimide is effected at a temperature of not more than 100° C.

15. The thermosetting resin composition according to claim 1, wherein the number average molecular weight of the resin obtained by grafting at least one compound having a graft-reactive group and a carboxylic anhydride on a polycarbodiimide is 500 to 1,000,000.

16. The thermosetting resin composition according to claim 1, wherein the epoxy compound is a compound having at least one epoxy group in the molecule.

17. The thermosetting resin composition according to claim 1, wherein the epoxy compound is an epoxy resin.

18. The thermosetting resin composition according to claim 1, wherein the epoxy resin is at least one epoxy resin selected from the group consisting of glycidyl ether epoxy resins, glycidyl ester epoxy resins, aromatic glycidyl amine epoxy resins, alicyclic epoxy resins, heterocyclic epoxy resins and liquid rubber-modified epoxy resins.

19. The thermosetting resin composition according to claim 1, wherein the amount of the epoxy compound (B) contained is 5 to 500 parts by weight per 100 parts by weight of the resin (A).

20. The thermosetting resin composition according to claim 1, which is obtained by mixing the resin (A) with the epoxy compound (B) in the presence or absence of a solvent.

21. A molded article obtained by molding the thermosetting resin composition according to claim 1.

22. The molded article according to claim 21, which is a heat-curable film or a cured film.

* * * * *